Figure 1:
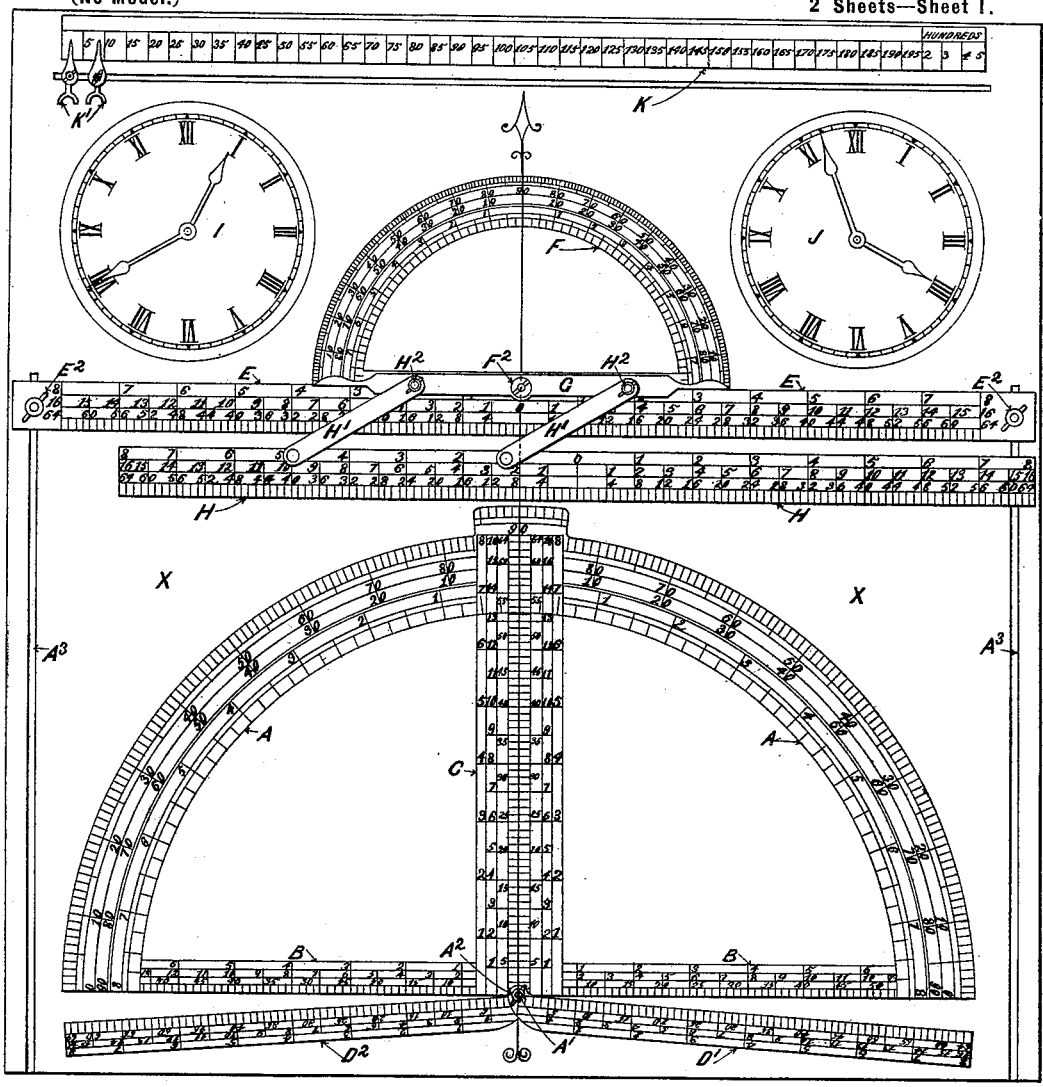

No. 623,866. Patented Apr. 25, 1899.
F. J. BAYLDON & A. H. ARMSTRONG.
INSTRUMENT FOR FACILITATING TRIGONOMETRICAL ADMEASUREMENTS.
(Application filed Nov. 12, 1898.)
(No Model.) 2 Sheets—Sheet 1.

No. 623,866. Patented Apr. 25, 1899.
F. J. BAYLDON & A. H. ARMSTRONG.
INSTRUMENT FOR FACILITATING TRIGONOMETRICAL ADMEASUREMENTS.
(Application filed Nov. 12, 1898.)
(No Model.) 2 Sheets—Sheet 2.
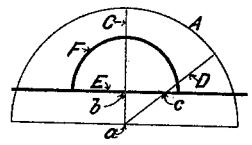 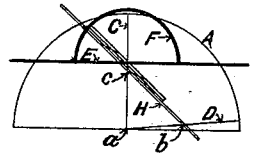 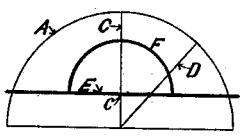 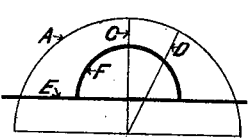
Dia:I.   Dia:II.   Dia:III.   Dia:IV.
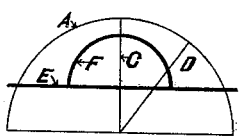 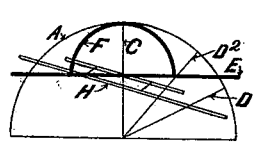 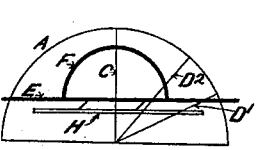 
Dia:V.   Dia:VI.   Dia:VII.   Dia:VIII.
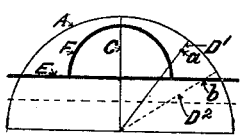 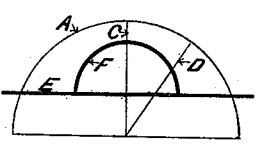 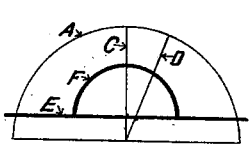 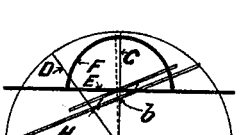
Dia:IX.   Dia:X.   Dia:XI.   Dia:XII.
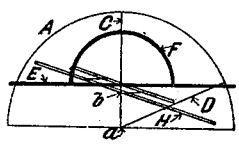 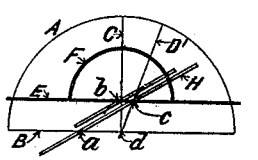 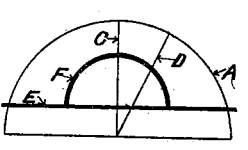 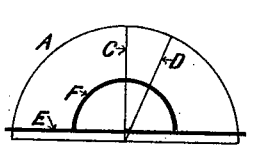
Dia:XIII.   Dia:XIV.   Dia:XV.   Dia:XVI.
THE NORRIS PETERS CO., PHOTO-LITHO., WASHINGTON, D. C.

UNITED STATES PATENT OFFICE.

FRANCIS J. BAYLDON, OF HORNCASTLE, AND ARNOLD H. ARMSTRONG, OF STOCKTON-ON-TEES, ENGLAND.

INSTRUMENT FOR FACILITATING TRIGONOMETRICAL ADMEASUREMENTS.

SPECIFICATION forming part of Letters Patent No. 623,866, dated April 25, 1899.

Application filed November 12, 1898. Serial No. 696,285. (No model.)

*To all whom it may concern:*

Be it known that we, FRANCIS JOSEPH BAYLDON, master mariner, holder of British Board of Trade Certificate No. 025,035, at present serving as third officer on board the Canadian-Australian Steamship Company's Steamship *Aorangi*, residing at Low Toynton Rectory, Horncastle, county of Lincoln, and ARNOLD HUDDART ARMSTRONG, at present serving as fourth engineer on board the said Steamship *Aorangi*, residing at No. 152ᵃ High street, Stockton-on-Tees, Durham, England, subjects of the Queen of Great Britain, have invented a new and useful Improved Instrument for Facilitating Trigonometrical Admeasurements and other Calculations, of which the following is a specification.

This invention relates to an improved instrument by which the admeasurements of the remaining sides and angles of triangles may be ascertained from the usual data by inspection, and thus renders unnecessary the time, the burden, and the material of calculation usually employed for such purposes.

This invention has been specially devised for the purpose of enabling navigators to ascertain angles and distances independently of books of tables and calculating materials and of providing them with a conveniently-handled and always accessible instrument from which they may ascertain by inspection distances of their vessel either at the moment or after the passage of time from objects ashore with no other data than that which their compass and the speed of said vessel afford and by which they may prove whether their vessel has been traveling on the proper course; but although this invention is specially useful to navigators, yet land-surveyors and the like will find it of great value as obviating many of their calculations, as also will engineers and others who use angular measurements to compute strains and stresses or the like.

This improved instrument for facilitating trigonometrical admeasurements and other calculations consists of certain movable parts mounted upon a base-plate of wood or metal or other material, upon which plate are engraved (or otherwise fixed) certain scales of measurements. On a base-line or diameter is a graduated scale, preferably termed the "base," from which rises a "protractor." Another similar graduated scale, preferably termed the "vertical," reaches centrally and at right angles from the base to the circumference. Mounted upon the center of the protractor are two movable radii, preferably termed "pointers," each bearing a graduated scale similar to those before mentioned. Reaching from side to side and adapted to slide over the pointers, the scales, and the protractor, and yet be always parallel to the base-scale, is another graduated scale termed the "bar." This sliding bar has guide-blocks in grooves in the base-plate of the instrument and is capable of being clamped in any desired position. A central protractor, termed the "upper protractor," is carried by this bar, and mounted upon its center is a double-ended pointer or indicator capable of being clamped in any desired position. A graduated scale similar to those before mentioned, preferably termed the "parallel," is jointed to this indicator, so as to have a parallel motion therewith and to be clamped at desired distances therefrom. The scales graduated on the base, the vertical, the pointers, the bar, and the parallel can be used to denote any unit—such as yards, miles, furlongs, cables, &c.—and they are preferably on the decimal system and are used when necessary as aliquot parts or multiples, as well understood.

Upon the base of the instrument there may be engraved two or more clock-faces or compass-dials having movable hands or indicators, and there may be one or more scales or the like having movable indicators; but these are not necessary though useful adjuncts for preserving certain notations from time to time.

In order that this invention may be clearly understood, the various parts of this improved instrument for facilitating trigonometrical admeasurements and other calculations and their particular uses (including some examples of such uses) will now be described with reference to the drawings herewith, in which—

Figure 2:
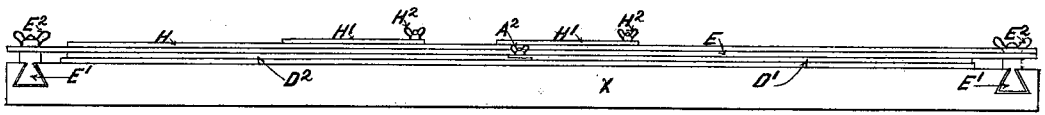

Figure 1 is a plan of said instrument, and Fig. 2 an edge view from bottom, while Diagrams I to XVI, on a smaller scale, serve to illustrate certain inspections instead of calculations, as hereinafter set forth.

On the plate or base-board X is engraved a protractor or graduated semicircle A, having graduated base B and graduated vertical C. On a pivot A', at the center of the protractor, are movable radial pointers D' and D², (adapted to be clamped by thumb-nut A²,) both bearing graduated scales on an edge which is a true radius. The bar E bears also graduated scales and is retained in parallelism with the base B by guide-blocks E', (in guide-grooves A³,) which may be immovably clamped by thumb-nuts E². From this sliding bar E extends upper protractor F, at whose center is a pivot, on which is double-ended indicator G, adapted to be clamped to said protractor by thumb-nut F². Jointed to the indicator by bars H' and adapted to be clamped by thumb-nuts H² is the parallel H, also bearing similar graduated scales.

I and J are engraved clock-faces with movable hands, and K is a graduated scale having movable indicators K'. These are adjuncts not necessary to the instrument, but useful, the first for denoting the times of taking observations, &c., and the latter for denoting mileage of a log or whatever distance or number it may be useful to remember.

The protractor A is for laying off any bearings or angles, which will be represented by the pointers D' and D², whose edges will thus form the one or two sides of a triangle, as necessary, and will indicate the length of that particular side or sides. The bar E is used to give or to find a third side or one or two other angles (or their sines and cosines) by being placed across the vertical and one pointer, or both. The upper protractor F enables the parallel H to be placed across the pointers and the vertical at various angles given or indicated by the pointer G and at various distances for side of triangle or other figure to enable other admeasurements of angles or sides to be given or found. The parallel especially enables readings to be taken from the protractor A and the other scales, which would otherwise be obscured by the bar B. By variously combining these movable parts on the fixed scales the lengths of the sides of triangles and the values of the angles are regulated or determined.

The scales shown in the drawings are divided into eight, sixteen, and sixty-four units—say miles; but if the distances be small each smallest unit can be taken to represent one-fourth of a mile, or one-half a mile, or one-fifth, or one-tenth, or one-twentieth of a mile, and so on.

To navigators this improved instrument will prove of incalculable value, for kept in its case (or ready mounted for use) on deck or on the bridge it is always handy. Practically no bad weather or motion of the ship can prevent its use, and it is reliable and accurate and very simple to manipulate, and all that it needs to work it can always be obtained—namely, a light, a compass, and a patent log or watch, while books, charts, pencils, or paper are not needed. The officer has not to leave the deck or bridge, but when off a coast there and then can obtain his ship's course and distance, difference of latitude and departure, distance off shore or any point, the distance he has passed or will pass off any particular point, the set and drift of a current, the course he is making, and many more items of vital necessity. With a little practice with the instrument in a minute can be obtained any particulars of this sort which otherwise would be neglected altogether or only attained after laborious calculations or else by drawing the same diagrams on a chart and then measuring them, necessitating leaving the deck. The instrument is not so especially intended for chart-room or fine-weather use, when other calculations may easily be made, as it is for bad and rainy weather or on a heavily-straining ship, when it is impossible to use books or papers or pencils on deck, or when for other reasons the officer is unable to leave the deck. The navigator when taking bearings off the land need not wait for the object observed to be on some particular bearing, but at any angle in a very short time he can obtain what he desires, the accuracy of the results only depending on the accuracy of the observer himself.

Land-surveyors or the like, with a knowledge of some of the angles and sides of a triangle or four-sided figure, can at once determine the measurements, including the length of the diagonal and area of the figure. Ordnance, naval, and other military forces may use the instrument as a convenient range-finder.

Engineers with this instrument will find it unnecessary to construct diagrams—viz., triangles of forces, &c. The graduated scales on the instrument dispense with the tedious process of drawing to very fine scales. For example, once the initial load on the piston, the length of stroke, and the length of connecting-rod of an engine are known the stresses on the guides may be obtained without reference to either trigonometry or graphic statics. The stress on each and every part of an ordinary jib, crane, or derrick may be at once ascertained and the safe working load definitely fixed.

It is not intended that the following exemplify the way in which problems must be solved, but only to show the method by which they might be, for there are various ways in which an accurate result from the same data can be obtained. The examples given illustrate but a small proportion of the uses to which the instrument can be reliably put.

To solve right-angled triangles, it is necessary that either one side and one angle or two sides shall be given. Then the remaining admeasurements are at once seen. The pointer denoting an angle of the triangle and also representing the hypotenuse, the vertical, and the parallel, (used horizontally,) or the bar will represent the base or perpendicular. As in Diagram I, one angle is fifty degrees and hypotenuse equals twenty-eight minutes. To find the other sides and the angles, the pointer D is placed on "50'" on the protractor A (the other angle is its complement—namely, forty degrees) and the bar E slide horizontally until it intersects "28'" on the pointer, which it does at c on its thus giving this length of a c as twenty-one and one-half minutes, and it is seen that it intersects the vertical C at b on "18'," which is thus the length of a b.

To solve oblique triangles, use the parallel obliquely to form the given angle and the two pointers or one pointer to measure one side, when the vertical will indicate the remaining sides and angles. The distances required are at the different points of intersection; but care must be taken in reading the distance off the parallel to see that the whole distance contained between the two other sides is noted—that is, the measurements, if so, on both sides of zero. To measure the angle of the parallel, take it direct from the upper protractor, as indicated by the index of the parallel. Thus in Diagram II, given the sides a b and a c and the angle at a, find other angles and the side b c. Place the pointer D at known angle a, move the parallel H obliquely, so as to cut the vertical, and the pointer at the known lengths of the sides a c and a b, respectively. Then the reading on said parallel contained between these two intersections is the length of the side b c. The angle made on the protractor by the parallel at c may be read off and the other angle b equals one hundred and eighty degrees minus a plus c, as well understood.

Course S. 40 E. and distance twenty-five minutes being given, the "difference of latitude" and "departure" are ascertained, as in Diagram III. Pointer D is placed at "40°" and the bar E to cut "25'" on said pointer, when the reading "16'" on the bar at this point of intersection is the departure and the reading on the vertical C—namely, "19'"—is the difference of latitude.

Difference of latitude nineteen minutes and distance twenty-one minutes being given, the course and departure are ascertained in Diagram IV. Bar E is placed at "19'" on the vertical and the pointer D with "21'" to cut said bar. Then the reading "9'" on the bar is the departure and the angle "25°" made by the pointer on the protractor A is the course.

To change departure into difference of longitude, proceed as in using the traverse tables. Latitude is thirty-six degrees and departure one hundred minutes, what is the difference of longitude? As in Diagram V, place pointer D at "36°" on protractor A, move bar E until the departure "100'" intersects the vertical C—that is, the difference of latitude column—then the corresponding distance "124'" on the pointer D is the difference of longitude.

To change difference of longitude into departure is a reverse method. Latitude is fifty-six degrees and difference of longitude is fifty minutes, what is the departure? As in Diagram V, pointer D is placed at "56°" on protractor A, and it is cut at "50'" with the bar, when the corresponding number "28'" on the vertical C is the departure.

The bearing and distance from each other of two points of land being ascertained from the chart and bearings taken of each of them when sighted, the ship's distance off them and also the passing distance, &c., is found thus: Apply variation and deviation to the bearing from the chart, and thus turn it into a compass-bearing, as in Diagram VI. Take the angle which this bearing makes with the ship's course and lay the parallel H at this angle by means of the upper protractor F and clamp it. Let the vertical C represent the ship's course and lay the pointers D' and $D^2$ on protractor A at the two bearings taken of the two objects. Move the bar E and parallel H until the distance of the objects from each other lies on said parallel exactly between the two pointers D' and $D^2$, and the intersection on each pointer then indicates the distance of the object whose bearing it denotes. Further, by placing the parallel H horizontally and moving it, as in Diagram VII, until it cuts first one and then the other pointer at these respective distances of objects just attained the distance the ship will pass off each object is found on said parallel, and the distance she has to run to do so is given by the vertical C. Two objects being abaft the beam, it is easiest to consider the ship as sailing along the base. Then the vertical represents the beam, and the bearings are laid off in the same way as before and the required results obtained. To ascertain the ship's distance off a point of land, also how far she must run to bring it abeam, and the distance it will be off when abeam or how much the ship has run since it was abeam and at what distance she passed off it, also whether the ship is making her course, is illustrated in Diagram VIII. The bearing of an object is reckoned as so many degrees or points on the bow. Place pointer D' to represent these degrees or points on the bow, reckoning them from the base-line of the instrument, and note the time. After this bearing has conveniently changed take a second bearing and denote it in the same way as before by the second pointer $D^2$. Again the time is noted, and thus the distance the ship has run since the first bearing may be estimated. Move the bar E horizontally until the distance traveled is indicated on this bar exactly between the two pointers D' and $D^2$, and then the distance on the pointer D' to the parallel H is the distance the ship was off the object at the first bearing, and the distance on the pointer $D^2$ is the distance the ship is off (such object) at time of second bearing. From the bar E to the second pointer D² on the vertical C is the distance to run to bring the object abeam, (the time when it will be passed can therefore be estimated,) and, lastly, the distance on the vertical C to the bar E is the passing distance. Leave the instrument with parts in the last-described positions and after the bearing has again changed take a third bearing and note the distance run by the log. Now move the second pointer D² to this bearing D³. Then if the ship is correctly making her course and distance this pointer (marked D³) will not cut the bar at a distance less than previously by the same amount as the ship has run, and thus the bar will be unchanged in position and give the same passing distance as before, while the reading on the pointer, now D³, is the distance off at the third bearing. Again, a fourth bearing can be taken to still further verify results and to ascertain whether the ship maintains her course, so that at any time after taking the second bearing by simply taking another bearing all these important details can be ascertained. When the object is abaft the beam, estimate the bearings as so many degrees or points abaft the vertical C, as by pointer, now D⁴, when the distance off the object is indicated by the measurement on said pointer D⁴, and the run since the object was abeam is shown on the bar E, and the distance off of the object when abeam is shown on the vertical C.

Having found at what distance a ship would pass off a point of land, to find how much to alter the course to make her pass at a given distance nearer or farther away take note of the bearing and distance of the object $a$ and, as in Diagram IX, show by the pointer D' and move the bar E horizontally until it cuts the required passing distance on the vertical C. Move the pointer D² until it is cut at $b$ by said bar E at the same distance as $a$ on the pointer D'. The number of degerees the pointers vary is the number of degrees to alter the ship's head toward or from the object, and the bar E gives the distance the ship has now to run to bring the object abeam. It thus follows that whenever the ship's course is altered it can at once be ascertained at what distance she will then pass off the object by moving the pointer the same number of degrees as the ship's course has been altered and moving the parallel to cut the pointer at the same distance as before.

The distance a vessel will pass off a light (the range of which is known) and how far it will travel before the light will be abeam is ascertained as illustrated in Diagram X. A twenty-one-mile light is seen three points on the bow, the eye being forty feet high. At this height the range of visibility is extended seven minutes, making the light visible at twenty-eight minutes. Pointer D is placed on the angle of the bow three points and the bar E to cut it at "28'," when the corresponding reading "15½'" on the bar is the distance the vessel will pass off the light, and the reading "23'" on the vertical is the distance the vessel has to travel before the light is abeam.

A vessel steering S. 40' W. is fifteen minutes off a point bearing S. 60° W. The problem of how far must she travel to bring the point abeam and what will her distance off it then be is illustrated by Diagram XI. As the point is at an angle of twenty degrees (sixty degrees minus forty degrees) on the bow place the pointer D at this angle on the protractor A and move the bar until it cuts the "15'" on pointer D, when the corresponding reading "5'" on said bar E is the distance the ship will pass from the point, and the distance "14'" on the vertical C is how far the ship must travel to so pass.

A point of land is thirty degrees on the bow, distant eight minutes. The problem to find how far must the ship go before it bears seventy degrees on the bow and then what will be her distance off is not illustrated, but it is solved as follows: Pointer D is placed at "30°" on protractor A and the bar at "70°" and move it until it cuts the pointer at "8'." The vertical gives the distance five and one-half minutes to run and the bar the distance four and one-fourth minutes the point is off. The course being then altered, so as to bring it two points on the bow, the distance she must travel to bring it abeam and what will be her passing distance is ascertained by placing pointer D at the two points on the protractor A and moving bar E horizontally to cut pointer D at "4½'," when the vertical C indicates the distance four and one-fourth minutes nearly to run and the bar E the passing distance two minutes nearly.

Referring to Diagram XII, being at $a$ close in with land, the ship ran twenty-seven minutes to westward, then the point of land $b$ is found to bear NNW. This point $b$ by chart bears W. ¼ N. from first position $a$, distant twenty-nine minutes. To ascertain the course steered and ship's distance from point $b$ is solved by regarding the vertical C as equaling W. ¼ N., and "29'" on it is the distance of $b$. Difference between W. ¼ N. and NNW. (five and three-fourths points) is indicated on the upper protractor F, and thus by the parallel H. Move the pointer until "27'" on it cuts the parallel, on which the reading "19'" is the distance of the ship from $b$, and the angle made by the pointer D is the course. Reckoned from the "S" it gives S. 53½° W. for the vertical, being W. ¼ N. the ninety-degree line must be S. ¼ W.

To find distance of a ship at anchor from the shore, as in Diagram XIII, two stations $a$ and $b$ are chosen, whose distance from each other is known as two and one-half minutes. From $a$ the angle subtended by the ship and $b$ is found to be sixty-four and one-fourth degrees and from $b$ the angle subtended by the ship and $a$ is found to be seventy-four degrees. Let the center of the protractor represent $a$ and two and one-half minutes measured on the vertical be $b$. With the pointer D make an angle at $a$ equal to sixty-four and one-fourth degrees. Place the parallel H at $b$—i. e., two and one-half minutes on vertical—and with it make an angle of seventy-four degrees on the upper protractor F, when its intersection with the pointer indicates the ship's position, giving the distance from $a$ as 3.6 miles and the parallel giving the distance from $b$ as 3.4 miles.

In a ship sailing along a coast a church $b$ and a mill $c$ are observed in one, the church being the nearer object. At the same time the angle subtended at the ship $a$ by the church $b$ and a tower $d$ on the coast is found to be twenty-five and one-half degrees. By chart the distance from church to tower was one and one-half minutes, from church to mill 0.75 of a mile, and from mill to tower 1.9 of a mile. Now the distance of the ship from church and tower is found as in Diagram XIV. The center of the protractor is taken as the tower $d$. Then 1.5 minutes along the vertical gives the church $b$. The parallel H is placed at an angle of twenty-five and one-half degrees with the horizontal, as indicated on upper protractor F, and is moved to 1.5 miles, (the church $b$.) When 0.75 minutes farther on, it will indicate the mill $c$, (the distance of which may also be measured by moving the pointer D' until it cuts the parallel at 1.9—the distance from tower $d$ to mill $c$.) Where the base B is cut by the parallel H is the distance 3.3 minutes of the ship $a$ from the tower $d$, and the reading "3.5'" on the parallel at the same place is the distance of the ship $a$ from the church $b$. It may be noticed that this example is culled from *Norrie's Epitome of Navigation*, but it is to be noted that the requirements of the problem can be solved by this instrument without the slightest necessity for the data referring to the mill.

The calculation of strains on derricks, spans, &c., is exemplified in Diagram XV. It is assumed the topping lift of a boom makes an angle of twenty-five degrees with the boom on which is supported a weight of eight tons, and it is required to ascertain the strain on the topping-lift and the thrust on the boom. Let the pointer D represent the topping-lift, the bar E represent the weight, and the vertical C the thrust on the boom, the pointer being at the required angle (twenty-five degrees) on the protractor A the bar is moved until it cuts said pointer D at "8'," the indication of the weight in tons, when the point of intersection on the vertical C is at "17.2'," which indicates the thrust in tons, and on the pointer at "19'" the strain on the topping-lift in tons. Again, to find the strain on the main lift when the yard is square and a weight of two tons is hanging at the lift and the lift makes an angle of twenty-two degrees with the yard, as in Diagram XVI, place the pointer at twenty-two degrees, move the bar until "2'" on it cuts the pointer. The reading "$5\frac{1}{2}$'" on the pointer is the strain on the lift in tons. Another problem unillustrated supposes the two legs of a span to support a weight of twelve tons, making an angle of twenty-four degrees with one leg and thirty-four degrees with the other, and it is required to ascertain the strain upon each leg. Let one pointer make an angle of twenty-four degrees with the vertical and the other pointer an angle on the opposite side of thirty-four degrees. Set the bar to one of the pointers—say first at an angle of twenty-four degrees—and move it so as to intersect the vertical at "12'" and the second pointer when the reading "$5\frac{3}{4}$'" on this second pointer gives the strain in tons on this leg and the distance "8'" on the bar between the two points of intersection give the strain on the other leg in tons; or the bar may at once be set to the angle of one side, and thus one pointer only need be used. Similarly, as set forth, all parallelograms may be solved and the length of the diagonal and the area of the figure also determined.

As in example (unillustrated) of calculations of angular strains by engineers, the following will suffice—namely, the ascertainment of the pressure on guides due to angularity of connecting-rod. The vertical represents the center line of the engine, the pointer represents the connecting-rod, and the parallel the crank. Taking the relation of connecting-rod and crank as three to one the scales are so placed that three units are cut off on the pointer and one on the bar. Then the initial load being represented on the vertical the reading between the vertical and the intersection of the bar and pointer represents the total load of the guide at its maximum. In this manner the pressure at any part of the stroke may be ascertained, which being multiplied by the coefficient of friction will give the resistance of the wearing-surface to the engine's motion. In designing and before indicator-cards can be taken a fairly accurate turning moment diagram may be constructed from data given by the instrument. By substracting the frictional resistance of the guide from the initial load a good idea is obtained of the pressure on crank-pin at different parts of the stroke. In this manner all stresses due to angularity of the connecting-rod may be quite easily seen as compared with complicated calculations in mathematics.

Having now particularly described and ascertained the nature of our said invention and in what manner the same is to be performed, we declare that what we claim is—

1. A calculating and measuring instrument, consisting of a base-board having a fixed protractor provided with a graduated base, a graduated vertical, and a center pivot, movable radial pointers mounted on said center pivot, means for clamping the radial pointers in the required position on the pivot, a graduated bar slidable in engagement with the base-board, parallel with the base of said protractor, and means for clamping the sliding bar in position, substantially as described.

2. A calculating and measuring instrument, consisting of a base-board having a fixed protractor provided with a graduated base, a graduated vertical, and a center pivot, two movable radial pointers mounted on said pivot and adjustable over the fixed protractor, a graduated bar slidable on the base-board parallel with the base of the fixed protractor, an adjustable, graduated parallel between the sliding bar and the fixed protractor, an indicator to which said parallel is jointed, and an upper protractor over which said indicator is movable, substantially as described.

3. The combination with a base-board having a fixed protractor, a graduated bar slidable in engagement with the base-board, an adjustable, graduated parallel located between said sliding bar and the fixed protractor, a double-ended centrally-pivoted indicator to which said parallel is jointed, and an upper protractor over which the indicator is movable, substantially as described.

In testimony whereof we have hereunto set our hands, at Sydney, in the British Colony of New South Wales, this 1st day of October, 1898, in presence of two subscribing witnesses.

FRANCIS J. BAYLDON.
ARNOLD H. ARMSTRONG.

Witnesses:
FRED WALSH,
PERCY NEWELL.